United States Patent
Mezey et al.

[15] 3,652,437
[45] Mar. 28, 1972

[54] PROCESS FOR THE PREPARATION OF PHOSPHINE

[72] Inventors: Eugene J. Mezey, Upper Arlington; Robert G. Laughlin, Springfield Township, Hamilton County, both of Ohio

[73] Assignee: The Procter & Gamble Company, Cincinnati, Ohio

[22] Filed: Sept. 25, 1969

[21] Appl. No.: 861,154

[52] U.S. Cl. ...............................204/164, 23/204
[51] Int. Cl. ......................C01b 25/06, B01k 1/00
[58] Field of Search ...................204/164; 23/204

[56] References Cited

UNITED STATES PATENTS 3,342,715  9/1967  Brissot et al. ..................204/164

FOREIGN PATENTS OR APPLICATIONS 934,764  11/1955  Germany ........................204/164

Primary Examiner—F. C. Edmundson
Attorney—Stephen R. Smith and Julius P. Filcik

[57] ABSTRACT

A process for preparing phosphine from elemental phosphorus and hydrogen using a plasma stream of electronically excited hydrogen is disclosed. Phosphine is useful as a fumigant and as an intermediate in the preparation of tetrakis(hydroxymethyl)phosphonium chloride, used to impart fire retardancy to fabrics.

13 Claims, No Drawings

PROCESS FOR THE PREPARATION OF PHOSPHINE

FIELD OF THE INVENTION

This invention relates to a process for the preparation of phosphorus compounds. More particularly, this invention relates to a process for the preparation of phosphine from elemental phosphorus and hydrogen. This invention also relates to a process for the preparation of phosphine using a heretofore-unknown synthetic technique involving the use of a plasma stream of electronically excited hydrogen.

BACKGROUND OF THE INVENTION

Processes for the preparation of phosphine are known. However, these methods for preparing phosphine have not resulted in a process in which phosphine can be produced inexpensively. For example, phosphine, $PH_3$, can be synthesized from the elements by catalytic techniques but the yields have been discouragingly small, see Stevenson et al., *J. Chem. Phys.*, 9, 403 (1941). Phosphine has also been reported to have been synthesized from elemental phosphorus and atomic hydrogen. See K. F. Bonhoffer, *Z. Phys. Chem.*, 113, 492 (1924), H. Kroepelin et al., *Z. Anorg. Allgem. Chem.*, 299, 1 (1936), E. I. Krylov et al., *J. Inorg. Chem.* (USSR), 3, 1727 (1958), and D. M. Wiles et al., *J. Phys. Chem.*, 61, 620 (1957). Phosphine can also be prepared by decomposing phosphonium iodide with dilute base or by treating white phosphorus with boiling aqueous potassium hydroxide solution, see D. M. Wiles et al., *J. Phys. Chem.*, 61, 620 (1957). Phosphine is prepared commercially by treating calcium phosphide with dilute acid, however, a major problem is encountered with this method in the handling and disposing of the inorganic wastes resulting from the process.

Because of the difficulty in preparation of phosphine and the low yields and by-products obtained, interests in the utilization of phosphines has been hindered. The methods described above for the preparation of phosphine predominantly are laboratory syntheses with the yields and the feasibility of using these methods not leading to the development of phosphine as an inexpensive article of commerce.

Phosphine is useful per se as a fumigant as described by D. P. Childs in *Tobacco*, 168, No. 17, p. 77 (Apr. 25, 1969). Phosphine is also useful as an intermediate in the preparation of tetrakis(hydroxymethyl) phosphonium chloride. Tetrakis(hydroxymethyl)phosphonium chloride is useful in treating fabrics to impart flame retardancy to the fabric. Tetrakis(hydroxymethyl)- phosphonium chloride can be prepared from phosphine by reacting the phosphine at a pressure of about 2 atmospheres with an aqueous solution of formaldehyde and hydrochloric acid. Almost quantitative conversion is obtained.

Accordingly, it is an object of this invention to prepare phosphine using a heretofore-unknown synthetic technique unlike the techniques heretofore attempted for the synthesis of phosphine.

In addition, it is an object of this invention to prepare phosphine from readily available raw materials, elemental phosphorus and hydrogen, at temperatures which eliminate the necessity of using equipment compatible with high temperatures or the need for using expensive catalysts in the preparation of phosphine.

In addition, it is an object of this invention to prepare phosphine in essentially pure form, and in good yields.

Also, it is an object of this invention to convert elemental phosphorus and hydrogen into a valuable and useful intermediate useful in the preparation of tetrakis(hydroxymethyl)- phosphonium chloride for use in imparting flame retardancy to fabrics.

Additionally, it is an object of this invention to provide a process for the preparation of phosphine from elemental phosphorus and hydrogen using a plasma stream of electronically excited hydrogen in an extremely modern technological approach and a heretofore-unknown process.

SUMMARY OF THE INVENTION

The objects of this invention are achieved according to the process described herein. The process of this invention for preparing phosphine comprises contacting phosphorus with a plasma stream of electronically excited hydrogen in a reaction zone, said hydrogen plasma stream being characterized as a stream of hydrogen irradiated with electromagnetic energy having a frequency of from 300 megaHertz to 100,000 megaHertz. The process of this invention allows the reaction products to be obtained rapidly, in good yields, and in essentially pure form.

More specifically, the process of this invention for the preparation of the phosphine comprises subjecting elemental phosphorus to a plasma stream of electronically excited hydrogen whereby the elemental phosphorus is reacted with the hydrogen to form phosphine. The phosphine formed can then be obtained using conventional and well-known separation techniques and subsequently used as an intermediate to prepare the useful compounds, as described above.

DETAILED DESCRIPTION OF THE INVENTION

In the process described above, phosphine is produced from elemental phosphorus by subjecting elemental phosphorus to a plasma stream of electronically excited hydrogen in a reaction zone. The process of this invention for the preparation of phosphine from elemental phosphorus and electronically excited hydrogen, $H_2^*$, can be summarized schematically by the following overall equation:

$$P_4 + 6H_2^* \rightarrow 4PH_3$$

The process of this invention involves the reduction of elemental phosphorus using an electronically excited hydrogen plasma stream.

Phosphorus used as the starting material in the process of this invention is commercially available. Hydrogen is also commercially available.

In the process of this invention, elemental phosphorus is contacted with the plasma stream of electronically excited hydrogen in a reaction zone. The term reaction zone is used herein to describe the area in which the elemental phosphorus is subjected to the plasma stream of electronically excited hydrogen to produce phosphine. Any vessel, chamber or container of any configuration or design is suitable for use as the reaction zone in the process of this invention. All that is necessary for the operation of the process of this invention is that the reaction zone be designed such that the elemental phosphorus can be subjected to the plasma stream of electronically excited hydrogen to produce the phosphine product of the process of this invention. One skilled in the art can select a reaction zone of suitable design and from appropriate materials to accomplish the objects of this invention.

No specific temperature is required in the reaction zone for conducting the process of this invention. The temperature of the reaction zone can range from −100°C. to 400°C., preferably from −10°C. to 165°C. An especially preferred embodiment of the process of this invention is subjecting elemental phosphorus to the plasma stream of electronically excited hydrogen at about or just above room temperature, e.g., from 0°C. to 50°C.

Any form of phosphorus, e.g., solid, liquid or gas (or any allotropic form of phosphorus) can be used in the process of this invention. At temperatures below the melting point of the elemental phosphorus, the elemental phosphorus can be in the form of a finely divided solid, as in a static bed reactor. The finely divided phosphorus can also be contacted with the plasma stream of electronically excited hydrogen by passing the hydrogen used in forming the plasma stream through the finely divided phosphorus to form a fluidized bed. The plasma stream is then created within or just above the fluidized bed. Where temperatures above the melting point of the phosphorus are used, the liquid phosphorus can be atomized and contacted with the plasma stream of the electronically excited hydrogen or the plasma stream of electronically excited hydrogen can be contacted with a thin film of the liquid phosphorus, as for example, in a thin film reactor. Where high temperatures, e.g., temperatures above the vaporization point of the phosphorus, are used, the phosphorus vapor can be contacted with the plasma stream of the electronically excited hydrogen by passing the phosphorus vapor through the plasma stream of electronically excited hydrogen to accomplish the objects of the process of this invention. Thus, the temperature used in the process of this invention can be a temperature which will be one of choice based on convenience and equipment design rather than on any temperature requirements necessitated by the process of this invention.

An essential part of the process of this invention is the preparation of a plasma stream of electronically excited hydrogen. The nature of plasma is described by Melvin B. Gottleib, *International Science and Technology*, pp. 44–50, Aug., 1965; and *Ind. & Eng. Chem.*, 55, 16–23, Jan., 1963. The technology of plasma flames and the production of plasma streams are relatively new having been described in the literature only in the past several years. One type of plasma flame which has been used and described in the literature is the DC plasma-jet. A number of articles on generating a plasma flame and on plasma technology are available in which plasma flames are used to achieve chemical syntheses not possible using typical chemical techniques. See Hans W. Leutner and Charles S. Stokes, *Ind. & Eng. Chem.*, 53, pp. 341–342 (May 1961); Hans W. Leutner, *I&EC Process Design & Development*, 1, pp. 166–168 (July, 1962); Charles S. Stokes, *Chem. Eng.*, pp. 191–194, 196 (Apr., 1965); Masao Sugaware et al., U.S. Pat. No. 3,192,427, patented June 29, 1965 for Plasma Flame Generator; C. A. Papp, *Chemical Engineering Progress*, 59, pp. 51–53 (June, 1963); *Industrial Engineering Chemistry*, 55, pp. 16–23 (Jan., 1963); C. S. Stokes and W. W. Knipe, *Industrial & Engineering Chemistry*, 52, 287–288 (Apr., 1960); and Thomas B. Reed, *International Science and Technology*, pp. 42–48, 76 (June, 1962).

Plasma streams of excited gases can be generated in other ways, as for example, where the gas used to form the plasma stream is subjected to an energy source other than an arc discharge, as for example, initiation of a plasma stream using a source of energy such as a spark from a Tesla coil, gamma radiation as from a cobalt 60 cell, or electrons from a hot tungsten filament and the simultaneous irradiation of the stream with electromagnetic energy in the microwave frequency range. Once initiated the plasma stream is sustained using microwave energy. The plasma stream of electronically excited hydrogen sustained using microwave energy is an essential part of the process of this invention.

A better understanding of the plasma stream used in the process of this invention can be obtained from the following discussion of the nature of the electronically excited hydrogen plasma stream. While not designed to be bound by theory it is believed that the plasma stream exists as a stream of hydrogen which is highly energetic and highly excited. Formation of the energetic and excited hydrogen stream occurs as energy is gained by the gas during plasma initiation and simultaneous irradiation with microwave energy. In the case of polyatomic gases such as hydrogen it is believed that energy states in the plasma stream are formed in which not only excited species of the polyatomic gases are formed, e.g., molecules having an energy level higher than that of the ground state, but in which the gases themselves are dissociated into their various atomic components, each of which has a considerably higher energy level than that which would be expected of the same material in its ground state. In addition, molecular fragments, positively charged nuclei, ions, and electrons are believed to be present in the plasma stream. Use of hydrogen in forming the plasma stream not only supplies a reactant but also provides energetic species having sufficient energy to cause the reaction with elemental phosphorus to occur.

The plasma stream of electronically excited hydrogen used in the process of this invention to cause the reaction of phosphorus to form phosphine is characterized as the product of passing electromagnetic energy in the microwave frequency range through a stream of hydrogen gas. Upon irradiation, the stream of hydrogen gains energy resulting in the formation of a plasma stream of electronically excited hydrogen. The electromagnetic energy in the microwave range suitable for use in the process of this invention can be generated using commercially available equipment and can range in frequency from 300 megaHertz to 100,000 megaHertz, preferably from 1,000 megaHertz to 5,000 megaHertz. Commercially available equipment such as a magnetron or a klystron can be used for production of the microwave energy. In these commercially available systems microwave energy is produced and conducted through waveguides or coaxial cable to an area of gas plasma formation. In the process of this invention the microwave energy is used to irradiate a stream of hydrogen gas to form a stream of electronically excited hydrogen. Magnetrons can be used to generate microwave energy over the frequency range of 300 to 10,000 megaHertz and klystrons can be used to generate microwave energy having frequencies up to 100,000 megaHertz. The frequency range of 1,000 megaHertz to 5,000 megaHertz is preferred because the higher the frequency the smaller the waveguides necessary to conduct the electromagnetic energy to the stream of hydrogen, resulting in smaller reaction zones with less capacity. Suitable microwave energy generators have power ratings ranging from less than 100 watts to greater than 30,000 watts. The specific microwave frequency and the power used are not critical so long as a plasma stream of electronically excited hydrogen is generated and sustained in the reaction zone to supply the energy necessary to cause the formation of phosphine.

The process of this invention is generally operated at reduced pressures, e.g., a pressure in the reaction zone of below 1 atmosphere. It is preferred that less than 1 atmosphere of pressure be used, e.g., from 0.001 atmosphere to 0.1 atmosphere, to facilitate generating and sustaining the hydrogen plasma stream for use in the process of this invention. An especially preferred range is from 0.01 to 0.05 atmosphere. The pressure in the reaction zone which will be necessary to accomplish the objects of this invention will be only that which is required to allow the formation and the sustaining of a plasma stream of electronically excited hydrogen for use in converting the phosphorus into phosphine. One skilled in the art can select a pressure at which the equipment can be operated to obtain a sustained plasma stream of electronically excited hydrogen.

The time necessary for the process of this invention in which phosphorus is converted into phosphine by being contacted with the plasma stream of electronically excited hydrogen is generally very short. The time necessary to achieve the conversion is in general a residence time in the reaction zone of from about 0.5 milliseconds to 50 milliseconds, more normally from about 1 millisecond to about 10 milliseconds. Generally, the stream of hydrogen can be fed into the reaction zone at from 1 to 20 standard cubic feet per minute per square foot of reaction zone cross sectional area.

The determination of the optimum conditions for operation of the process of this invention for a specific set of reaction conditions, e.g., temperature, reactant feed ratios, hydrogen flow rate, reaction time, pressure, is within the skill of one knowledgeable in the art and can be simply accomplished by analysis of the reaction products obtained, for example, by analyzing the effluent gas stream from the reaction zone. Adjustments can then be made in the above to obtain the objects of the process of this invention by determining the amount of phosphine obtained. For example, where the yield of phosphine is low, higher hydrogen/phosphorus ratios can be used to increase the phosphine yield.

Once elemental phosphorus is contacted with the plasma stream of electronically excited hydrogen, the phosphine produced is separated from any unreacted starting materials and any reaction by-products. The separation of phosphine can be accomplished by conventional and well-known techniques. For example, the effluent gas stream from the reaction zone can be passed through a cold trap, e.g., any cold trap having a temperature of below −190°C., whereby the phosphine is condensed. The unreacted hydrogen can then be simply vented from the system. When desired the hydrogen can be recycled.

In an embodiment of the process of this invention a plasma stream of electronically excited hydrogen is established by initially forming an inert gas plasma flame, e.g., helium, and irradiating it with microwave energy as described in the co-pending applications of Eugene J. Mezey, for Process for Preparing an Anhydride of Trivalent Phosphorus using Electronically Excited Helium, Ser. No. 861,145, filed Sept. 25, 1969, and Eugene J. Mezey and Robert E. Hall for Process for Preparing an Anhydride of Trivalent Phosphorus using Electronically Excited Carbon Dioxide or Nitric Oxide, Ser. No. 861,159, filed Sept. 25, 1969. Over a period of time hydrogen is then mixed with the helium stream to form a mixed gas plasma stream such that just prior to the beginning of the reaction, the plasma stream is comprised solely of electronically excited hydrogen. Use of this embodiment is a matter of choice and the plasma flame can be established using hydrogen initially, where desired.

The amount of hydrogen used to obtain the objects of the process of this invention is based on the amount of hydrogen which is necessary stoichiometrically to transform the elemental phosphorus into phosphine. For example, 6 moles of hydrogen are necessary for each mole of elemental phosphorus ($P_4$) converted into phosphine. Excess hydrogen can be used where desired, e.g., up to about 1,000 moles of hydrogen per mole of phosphorus. A preferred hydrogen/phosphorus molar ratio is from 30:1 to 6:1. It is not desirable to use less than the stoichiometric amount of hydrogen from the standpoint of yields of phosphine. Lower than the stoichiometric amount, e.g., from about 1 to 2 moles of hydrogen to phosphorus, will result in phosphine formation but the yield of phosphine will be correspondingly reduced.

The phosphine produced in the process of this invention is produced in exceptionally pure form, e.g., from 95 to 99 percent pure. The product of the process of this invention, phosphine, is valuable as a fumigant per se and as an intermediate in the preparation of tetrakis(hydroxymethyl)phosphonium chloride for use in imparting flame retardancy to fabrics, as hereinbefore described.

The following examples are illustrative of the present invention and not intended in any way to limit the full scope of the invention as described herein.

EXAMPLES

Starting Materials

The hydrogen used was purified by palladium diffusion. Red and yellow phosphorus were purchased commercially. In those preparations of phosphine in which yellow phosphorus was used, it was cut under water into pieces small enough to be placed in a glass tube where it was dried with a stream of oil-pumped nitrogen before being transferred to nitrogen-purged equipment. In those preparations of phosphine in which red phosphorus was used, it was used directly as supplied and handled in air.

Description of the Apparatus

The apparatus used in the phosphine syntheses comprised a reaction zone, a product train, equipment for generating electromagnetic energy in the microwave frequency range, and associated equipment.

a. Reaction zone

The reaction zone was a vertically oriented fused silica tube closed at the bottom. The reaction zone was connected to a source of hydrogen and either contained or was connected to a source of elemental phosphorus. The hydrogen was fed into the reaction zone using a fused silica hydrogen inlet tube, surrounded by a microwave cavity described hereinafter. The hydrogen inlet tube was connected to the top of the reaction zone with the long axis of the inlet tube being centered over the long axis of the reaction zone. Where phosphorus vapor was used as the phosphorus source the elemental phosphorus was vaporized in a phosphorus vaporizer. Using its own vapor pressure phosphorus vapor was passed into the reaction zone through an inlet tube located toward the top of and perpendicular to the long axis of the reaction zone. Where solid phosphorus was used as the phosphorus source the solid phosphorus was placed under nitrogen and transferred in bulk into the reaction zone. The reaction zone was connected by glass tubing to the product train.

b. Product Train

The product train comprised three removable and isolatable cold traps connected in series. The last trap was connected to a Hi-vac 28 pump. Stopcocks greased with Apiezon-N were used to separate the traps and isolate the product train from the pump. The last two traps of the train contained a coiled sheet of flutted aluminum foil, to give added surface area to each cold trap and increase its capacity to remove material condensable at −196°C. from the effluent gas from the reaction zone during a run. The first trap down stream stream of the reaction zone contained no foil for easy cleaning. A manometer was connected to the product train with three-way stopcocks to permit pressure measurement either in the reaction zone, just ahead of the first trap, or up stream from the plasma center.

The low temperatures required for use in the cold traps were attained with conventional refrigerants such as ice, solid carbon dioxide and liquid nitrogen. Slush baths of toluene and methylcyclohexane in liquid nitrogen were used to maintain temperatures of −93°C. and −126°C., respectively.

c. Microwave Equipment

The microwave energy was supplied by a magnetron (Litton L-3460) which was powered by a Litton Model 218 power source. The magnetron was tunable over a 2,350 to 3,575 megaHertz range. All work was centered around 2,450 megaHertz. The power of the magnetron could be controlled from less than 100 to greater than 1,000 watts. The microwave energy was conducted through a waveguide to a coaxial cable transition piece. The microwave power was transmitted through the coaxial cable to a fore-shortened quarter wave coaxial cavity [see F. C. Fehshenfeld et al., Rev. Sci. Inst., 36, 294 (1965)] through which the hydrogen inlet tube to the reaction zone passed. Air cooling of the microwave cavity was necessary to prevent overheating.

d. Associated Equipment

The apparatus was operated at below atmospheric pressure using a Cenco Hyvac 28 forepump. Pumping speeds of 220 liter per minute at 1.0 torr (1 mm. Hg) were obtainable with this pump. In addition, the apparatus was equipped with its own forepump for basic vacuum manipulations.

The basic vacuum system consisted of a manifold with connections to a storage bulb, manometer, McLeod gauge and the product train. Hydrogen feed rates into the apparatus were regulated by needle valves through a calibrated float-type flow meter.

PHOSPHORUS SOURCES

In those instances in which phosphorus vapor was used as the phosphorus source, the phosphorus vapor was produced in a phosphorus vaporizer and passed into the reaction zone due to its own vapor pressure. Dry solid yellow phosphorus was added to the nitrogen-purged phosphorus vaporizer. The phosphorus vaporizer was connected to the reaction zone by means of a No. 5 O-ring joint and was isolated from the reaction zone with a greaseless stopcock.

An oil bath which ranged in temperatures from 63°C. to 160°C. and controlled to ±0.2°C. was used to heat the phosphorus vaporizer, to melt the solid phosphorus when vaporous yellow phosphorus was used and to obtain a specific phosphorus vapor pressure. The exit tube from the phosphorus vaporizer to the reaction zone was heated by conduction from the oil bath through a copper coil wrapped around the exit tube.

The amount of phosphorus vapor fed into the reaction zone during a run involving vaporous phosphorus was measured volumetrically by the difference in the liquid level of phosphorus in the phosphorus vaporizer before and after the run. The liquid yellow phosphorus in the phosphorus vaporizer was contained in a calibrated tube. The volume in the calibrated tube could be measured to the nearest 0.02 ml. The phosphorus vaporizer was totally immersed in the thermostated oil bath. The tubing from the phosphorus vaporizer to the reaction zone consisted of a section of 0.25 mm. capillary tubing 10 cm. long which was connected to a greaseless stopcock. The tube from the greaseless stopcock was connected to the reaction zone through a No. 5 O-ring joint. The entire length of the tubing from the surface of the oil bath to the reaction zone was heated to 200°–220°C., and was always kept hotter than the oil bath. In order to obtain as uniform a heat distribution as possible, the glass tubing carrying the phosphorus vapor from the phosphorus vaporizer to the reaction zone was wrapped with aluminum foil before securing a heating tape and wrapped with aluminum foil again after the heating tape was in place around the tubing. No phosphorus condensed in the feed line to the reaction zone. The tube from the O-ring joint to the reaction zone also was heated. Assuming that the phosphorus temperature was that of the oil bath, the rate of phosphorus vapor fed to the reactor was calculated from reliable density values and the observed change in liquid volume [see T. D. Farr, "Phosphorus," Chem. Eng. Report No. 8, TVA Authority, Wilson Dam, Alabama (1950)].

Yellow phosphorus was added to the phosphorus vaporizer under reduced pressure by melting the phosphorus into the phosphorus vaporizer from the nitrogen-purged drying tube. When the transfer was complete, the molten phosphorus in the phosphorus vaporizer was degassed under reduced pressure and the side arm through which the phosphorus was introduced was sealed under reduced pressure.

In those instances in which solid red phosphorus were used the solid red phosphorus was added directly to the reaction zone.

GENERAL PROCEDURE

The apparatus was assembled by connecting the reaction zone to the product train and if phosphorus vapor were used to the phosphorus vaporizer. The apparatus was evacuated and the system was checked for leaks. The desired hydrogen flow was established, the pressure of the system set, the microwave source was brought up to power (generally 200–250 watts) and the plasma initiated with the aid of a Tesla coil. The microwave cavity was then tuned for minimum reflected power. Aside from occasional checks on pressure and hydrogen flow no other procedural checks were necessary during the run. The products were isolated from the hydrogen stream by passing the gases through the product train, i.e., the series of cold traps. At the completion of the run, hydrogen flow (and if phosphorus vapor were used the phosphorus vapor flow) was stopped and the microwave energy source shut off. After the contents of the reaction zone were evacuated into the product train, the product train was isolated from the reaction zone and all of the volatile products were condensed into one trap. The phosphine produced was separated from any other volatile gases such as other phosphorus hydrides (diphosphine) by slowly warming this trap from −196°C. to room temperature and passing the vapors through a trap cooled to −93°C.

ANALYTICAL PROCEDURE

The amount of phosphine formed during the run was determined by weighing the product obtained using the separation procedure described above in either a 500 ml. or a 250 ml. bulb. An infrared spectrogram which was run on the phosphine obtained revealed pure phosphine.

EXAMPLE I

Preparation of Phosphine using Yellow Phosphorus Vapor

The reaction zone was 40 mm. i.d. ( ~ 90 cm.$^3$) tube which was tapered to a 15 mm. o.d. tube so as to gradually increase the linear velocity of the product stream. The tube, constructed from a No. 40 O-ring joint, served as the bottom of the reaction zone and was about 20 cm. long. The reaction zone was cooled to −78°C. during operation. The hydrogen plasma inlet tube (13 mm. o.d. fused silica) was axially aligned with the reaction zone.

The hydrogen inlet tube, the reaction zone, the phosphorus vapor source and the product train, including the cold traps, were connected, purged with nitrogen and evacuated. The hydrogen flow was established at a rate of 6.41 millimoles per minute at a pressure of less than 1 torr. The plasma was approximately 4 centimeters below the hydrogen inlet tube to the reaction zone. Phosphorus vapor obtained from the phosphorus source, e.g., by heating the phosphorus vaporizer to a temperature of approximately 60°C. to 160°C., was introduced into the reaction zone at a rate of 4.25 mg. atoms/hr. This gave rise to a phosphine rate of formation of 1.33 millimoles per hour and a yield of 25.2 percent per hour.

EXAMPLE II

Preparation of Phosphine

Using Yellow Phosphorus Vapor

The procedure of Example I was used except that the reaction zone was modified by positioning the phosphorus vapor inlet tube and the hydrogen inlet tube such that the inlet streams of phosphorus vapor and hydrogen occurred at a 90° angle to each other in the reaction zone. The reaction zone was so constructed that a residence time of about 0.01 second at a hydrogen flow rate of 6.41 millimoles per min. at 1 torr was obtained. The discharge tube from the reaction zone to the product train was perpendicular to the long axis of the reaction zone. The phosphorus vapor inlet to the reaction zone was flared to give a 1 mm. annular space between the wall of the reaction zone and the outside diameter of the phosphorus vapor inlet tube. The bottom of the reaction zone (approximately 40 mm. o.d.), was cooled to −78°C. during the run. The amount of phosphorus fed into the reaction zone was measured volumetrically. The reaction zone was connected to the hydrogen inlet, to the phosphorus vapor source and to the product train. The system was purged and evacuated to a pressure of 1.0 torr. Hydrogen was passed into the inlet tube at a flow rate of 6.41 mmoles/min. with the plasma being established approximately 3 cm. above the phosphorus vapor inlet tube. The phosphorus vapor was passed into the reaction zone from the phosphorus vaporizer at a rate of 15.42 mg. atom/hr. and a 16.7 percent yield of phosphine per hour was obtained resulting in a rate of phosphine formation of 2.54 mmoles/hr.

EXAMPLE III

Preparation of Phosphine

Using Yellow Phosphorus Vapor

The procedure of Example II was repeated except that the plasma position was changed to approximately 5 centimeters below the phosphorus vapor inlet tube and the phosphorus vapor rate was changed to 4.3 mg. atom/hr. A 25.6 percent yield of phosphine per hour at a rate of 1.103 millimoles/hr. was obtained.

EXAMPLE IV

Preparation of Phosphine

Using Solid Red Phosphorus

The reaction zone was constructed from 11 mm. i.d. fused silica tubing bent at a right angle to the horizontal inlet to the product train. The phosphorus bed was supported at the bottom of the reaction zone with a loose quartz-wool plug held in place by indentations in the reaction zone tube. When the reaction zone was in an upright position, the plasma was generated in the vertical section of the tube approximately 5 centimeters above the static bed of solid phosphorus. A weighed amount of red phosphorus was added to the reaction zone. The reaction zone was connected to the source of hydrogen gas and to the product train. The system was then purged and evacuated to a pressure of approximately 0.01 torr. A flow rate of 1.34 mmoles/min. of hydrogen was established and the plasma initiated as in Example I. The reaction was run until all of the phosphorus was consumed. The reaction time was 210 minutes. This resulted in 8.38 milligram atoms of phosphorus being consumed at a rate of 2.39 milligram atoms/hour. Once the phosphine was separated and purified 4.29 millimoles was obtained resulting in a yield of 51.2 percent and a phosphine rate of formation of 1.23 millimoles/hr.

EXAMPLE V

Preparation of Phosphine

Using Solid Yellow Phosphorus

The procedure of Example IV was repeated except that the reaction time was reduced to 27 minutes and solid yellow phosphorus was substituted for the solid red phosphorus resulting in the consumption of 9.32 milligram-atoms of phosphorus at a consumption rate of 20.7 milligram-atoms/hr. This run resulted in 0.703 millimoles of phosphine being formed (a 7.55 percent yield) at a rate of 1.56 millimoles of phosphine per hour.

EXAMPLE VI

Preparation of Phosphine

Using Solid Red Phosphorus

The procedure of Example IV was repeated except that the reaction time was 70 min., the hydrogen flow rate was increased to 25.5 millimoles/min., and the pressure increased to 15 torr. This run resulted in 6.98 milligram-atoms of phosphorus being consumed at a rate of 5.98 milligram-atoms per hour. 3.71 millimoles of phosphine was obtained resulting in a 53.2 percent yield at a rate of 3.18 millimoles/per hour.

EXAMPLE VII

Preparation of Phosphine

Using Solid Red Phosphorus

The procedure of Example IV was repeated except that the reaction time was reduced to 72 minutes and the flow rate of hydrogen was increased to 3.55 millimoles/min. at a pressure of 4 torr. This resulted in the consumption of 4.84 milligram-atoms of phosphorus at a rate of 4.03 milligram-atoms/hr. A 68.8 percent yield of phosphine (3.33 millimoles) was obtained at a rate of 2.78 millimoles/hr.

What is claimed is:

1. A process for preparing phosphine comprising subjecting elemental phosphorus to a plasma stream of electronically excited hydrogen in a reaction zone, said hydrogen plasma stream being characterized as a stream of hydrogen irradiated with electromagnetic energy having a frequency of from 300 megaHertz to 100,000 megaHertz.

2. The process of claim 1 wherein the reaction zone has a temperature of from −100°C. to 400°C.

3. The process of claim 2 wherein the frequency is from 1,000 megaHertz to 5,000 megaHertz.

4. The process of claim 3 wherein the reaction zone has a temperature of from −10°C. to 165°C.

5. The process of claim 4 wherein the reaction zone is operated at a pressure of from 0.001 atmosphere to 0.1 atmosphere.

6. The process of claim 5 wherein the molar ratio of elemental phosphorus to hydrogen is from 1:6 to 1:1,000.

7. The process of claim 6 wherein the molar ratio of elemental phosphorus to hydrogen is from 1:6 to 1:30.

8. A process for preparing phosphine comprising:
   1. forming a plasma stream of electronically excited hydrogen, said plasma stream being characterized as a stream of hydrogen irradiated with electromagnetic energy having a frequency of from 300 megaHertz to 100,000 megaHertz;
   2. subjecting elemental phosphorus to the plasma stream of electronically excited hydrogen to form phosphine; and
   3. separating the phosphine.

9. The process of claim 8 wherein the reaction zone has a temperature of from −100°C. to 400°C.

10. The process of claim 9 wherein the frequency is from 1,000 megaHertz to 5,000 megaHertz and wherein the reaction zone has a temperature of from −10°C. to 165°C.

11. The process of claim 10 wherein the reaction zone is operated at a pressure of from 0.001 atmosphere to 0.1 atmosphere.

12. The process of claim 11 wherein the molar ratio of elemental phosphorus to hydrogen is from 1:6 to 1:1000.

13. The process of claim 12 wherein the molar ratio of elemental phosphorus to the gas is from 1:6 to 1:30.

* * * * *